United States Patent
Bhattad et al.

(10) Patent No.: US 9,585,156 B2
(45) Date of Patent: Feb. 28, 2017

(54) SUPPORTING DIFFERENT LTE-TDD CONFIGURATIONS IN NEIGHBORING REGIONS AND/OR ADJACENT CARRIERS

(71) Applicant: QUALCOMM Incorporated, San Diego, CA (US)

(72) Inventors: Kapil Bhattad, Bangalore (IN); Dhananjay Ashok Gore, Bangalore (IN); Tamer Adel Kadous, San Diego, CA (US); Ashok Mantravadi, San Diego, CA (US); Ahmed Sadek, San Diego, CA (US); Raj Kumar, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 583 days.

(21) Appl. No.: 13/672,458

(22) Filed: Nov. 8, 2012

(65) Prior Publication Data

US 2013/0121189 A1 May 16, 2013

Related U.S. Application Data

(60) Provisional application No. 61/559,466, filed on Nov. 14, 2011.

(51) Int. Cl.
*H04W 72/08* (2009.01)
*H04L 5/14* (2006.01)
(Continued)

(52) U.S. Cl.
CPC .......... *H04W 72/082* (2013.01); *H04L 5/1484* (2013.01); *H04W 16/14* (2013.01); *H04B 7/2656* (2013.01); *H04W 72/12* (2013.01)

(58) Field of Classification Search
None
See application file for complete search history.

(56) References Cited

U.S. PATENT DOCUMENTS 6,996,078 B2 2/2006 Pan et al.
7,826,438 B1 11/2010 Salhotra et al.
(Continued)

FOREIGN PATENT DOCUMENTS

CN 1369975 A 9/2002
CN 1543749 A 11/2004
(Continued)

OTHER PUBLICATIONS

Ericsson et al., "UL/DL interference scenarios in LTE TDD", 3GPP Draft; R1-112084, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20110822, Aug. 16, 2011 (Aug. 16, 2011), XP050537272, [retrieved on Aug. 16, 2011].
(Continued)

*Primary Examiner* — Ayaz Sheikh
*Assistant Examiner* — Peter Chau
(74) *Attorney, Agent, or Firm* — Seyfarth Shaw LLP

(57) ABSTRACT

When communications of a single radio access technology (RAT), or different radio access technologies in a proximate communication spectrum are operating at the same time, potential interference between devices may occur. To reduce the interference, the time division duplex (TDD) configuration of one or more conflicting device may be altered. For example, at the edge of a communication region, TDD configurations used by edge base stations to communicate with mobile devices may be set to reduce interference. As another example, communications of a first device may be altered so the first device schedules uplink communications when a second device also has uplink communications scheduled. Other configurations may also be implemented.

30 Claims, 12 Drawing Sheets

(51) Int. Cl.
*H04W 16/14* (2009.01)
*H04W 72/12* (2009.01)
*H04B 7/26* (2006.01)

(56) References Cited

U.S. PATENT DOCUMENTS

| | | |
|---|---|---|
| 2002/0015393 A1* | 2/2002 | Pan et al. .................... 370/335 |
| 2002/0105918 A1* | 8/2002 | Yamada et al. ............. 370/294 |
| 2003/0036358 A1* | 2/2003 | Pan ............................... 455/63 |
| 2005/0169217 A1* | 8/2005 | Pan ............................. 370/335 |
| 2005/0266846 A1 | 12/2005 | Kim et al. |
| 2009/0052353 A1* | 2/2009 | D'Amico et al. ........... 370/280 |
| 2009/0103440 A1 | 4/2009 | Wang et al. |
| 2009/0170542 A1* | 7/2009 | Chen et al. .................. 455/501 |
| 2009/0268685 A1 | 10/2009 | Chen et al. |
| 2009/0274076 A1* | 11/2009 | Muharemovic et al. ..... 370/280 |
| 2010/0074204 A1 | 3/2010 | Meylan |
| 2010/0128686 A1 | 5/2010 | Nishio et al. |
| 2010/0195583 A1 | 8/2010 | Nory et al. |
| 2010/0220597 A1* | 9/2010 | Ji .......................... H04W 16/10 370/241 |
| 2010/0246456 A1 | 9/2010 | Suo et al. |
| 2010/0309867 A1 | 12/2010 | Palanki et al. |
| 2011/0032852 A1 | 2/2011 | Xin |
| 2011/0111779 A1* | 5/2011 | Krishnamurthy et al. ... 455/501 |
| 2011/0117949 A1 | 5/2011 | Joko |
| 2011/0130099 A1* | 6/2011 | Madan et al. ................ 455/63.1 |
| 2011/0170499 A1 | 7/2011 | Nayeb et al. |
| 2011/0176435 A1 | 7/2011 | Khandekar et al. |
| 2011/0176461 A1 | 7/2011 | Astely et al. |
| 2011/0211503 A1 | 9/2011 | Che et al. |
| 2011/0250913 A1 | 10/2011 | Vajapeyam et al. |
| 2011/0310830 A1 | 12/2011 | Wu et al. |
| 2012/0002597 A1 | 1/2012 | Yang et al. |
| 2012/0082070 A1 | 4/2012 | Hart et al. |
| 2012/0195224 A1 | 8/2012 | Kazmi et al. |
| 2012/0207125 A1 | 8/2012 | Takamatsu |
| 2012/0257519 A1* | 10/2012 | Frank et al. .................... 370/252 |
| 2013/0010711 A1 | 1/2013 | Larsson et al. |
| 2013/0084907 A1 | 4/2013 | Shen et al. |
| 2013/0094387 A1* | 4/2013 | Susitaival ........... H04W 72/085 370/252 |
| 2013/0343241 A1 | 12/2013 | Niu et al. |
| 2014/0023004 A1 | 1/2014 | Kumar et al. |
| 2014/0050107 A1* | 2/2014 | Charbit ............. H04W 72/1289 370/252 |
| 2014/0122957 A1* | 5/2014 | Charbit et al. ................ 714/748 |
| 2014/0160967 A1* | 6/2014 | Gao ..................... H04W 24/10 370/252 |
| 2014/0198766 A1 | 7/2014 | Siomina et al. |
| 2014/0233439 A1* | 8/2014 | Hong et al. .................... 370/280 |
| 2014/0269457 A1 | 9/2014 | Folke et al. |

FOREIGN PATENT DOCUMENTS

| | | |
|---|---|---|
| CN | 101873686 A | 10/2010 |
| EP | 1229671 A2 | 8/2002 |
| EP | 2040503 A1 | 3/2009 |
| EP | 2056528 A1 | 5/2009 |
| JP | 2002232940 A | 8/2002 |
| WO | 02103943 A1 | 12/2002 |
| WO | 03017696 A1 | 2/2003 |
| WO | 2009045011 A1 | 4/2009 |
| WO | 2009120888 A2 | 10/2009 |
| WO | 2010022070 A1 | 2/2010 |
| WO | 2010138768 A1 | 12/2010 |
| WO | 2011162656 A1 | 12/2011 |
| WO | 2012044240 A1 | 4/2012 |

OTHER PUBLICATIONS

International Search Report and Written Opinion—PCT/US2012/064343—ISA/EPO—Jun. 4, 2013.
Lee, H., et al., "Combination of Dynamic-TDD and Static-TDD Based on Adaptive Power Control", IEEE 68th Vehicular Technology Conference (VTC), Sep. 21, 2008, IEEE, Piscataway, NJ, USA, pp. 1-5, XP031352570, ISBN: 978-1-4244-1721-6, the whole document.
Partial International Search Report—PCT/US2012/064343—ISA/EPO—Feb. 22, 2013.
ZTE: "Different deployment scenarios for co-existence study for TDD-LTE", 3GPP Draft; R4-114051, 3rd Generation Partnership Project (3GPP), Mobile Competence Centre ; 650, Route Des Lucioles ; F-06921 Sophia-Antipolis Cedex ; France, vol. RAN WG4, no. Athens, Greece; 20110822, Aug. 16, 2011 (Aug. 16, 2011), XP050543102, [retrieved on Aug. 16, 2011].
Chang P., et al., "Interference Analysis and Performance Evaluation for LTE TDD System," International Conference on Advanced Computer Control (ICACC), 2010, pp. 410-414.
Huawei: "Resource allocation for uplink ACK/NACK multiplexing", 3GPP Draft; R1-104282, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; 20100823, Aug. 17, 2010 (Aug. 17, 2010), XP050449651, [retrieved on Aug. 17, 2010].
Samsung: "PUCCH HARQ-ACK Resource Mapping for DL CA", 3GPP Draft; R1-104582 PUCCH A N Resource Indexing, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; 20100823, Aug. 17, 2010 (Aug. 17, 2010), XP050449877.
European Search Report—EP14192548—Search Authority—The Hague—Mar. 11, 2015.
New Postcom, "Need and Feasibility of using Different Uplink-downlink Configurations for TDD HeNBs in Heterogeneous Networks," 3GPP TSG-RAN WG1#61bis, 3GPP, Jul. 2, 2010, R1-103688, 6 pages.

* cited by examiner

SUPPORTING DIFFERENT LTE-TDD CONFIGURATIONS IN NEIGHBORING REGIONS AND/OR ADJACENT CARRIERS

CROSS-REFERENCE TO RELATED APPLICATION

This application claims the benefit under 35 U.S.C. §119(e) to U.S. Provisional Patent Application No. 61/559,466 entitled "SUPPORTING DIFFERENT LTE-TDD CONFIGURATIONS IN NEIGHBORING REGIONS AND/OR ADJACENT CARRIERS" filed on Nov. 14, 2011, the disclosure of which is expressly incorporated by reference herein in its entirety.

BACKGROUND

Field

Aspects of the present disclosure relate generally to wireless communication systems, and more particularly to supporting different LTE-TDD configurations in neighboring regions and/or adjacent carriers.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Offered is a method of wireless communication. The method includes scheduling user equipments (UEs) served by a first set of base stations in accordance with a first time division duplex (TDD) configuration. The first set of base stations is located between a second set of base stations in a first region that operates in a second TDD configuration and a third set of base stations in a second region that operate in a third TDD configuration. The first TDD configuration has no downlink subframe colliding with an uplink subframe of the second TDD configuration. The method also includes restricting UEs served by the first set of base stations to avoid user equipment to user equipment interference with UEs and base stations operating with the third TDD configuration.

Offered is an apparatus for wireless communication. The apparatus includes means for scheduling user equipments (UEs) served by a first set of base stations in accordance with a first time division duplex (TDD) configuration. The first set of base stations is located between a second set of base stations in a first region that operates in a second TDD configuration and a third set of base stations in a second region that operate in a third TDD configuration. The first TDD configuration has no downlink subframe colliding with an uplink subframe of the second TDD configuration. The apparatus also includes means for restricting UEs served by the first set of base stations to avoid user equipment to user equipment interference with UEs and base stations operating with the third TDD configuration.

Offered is a computer program product configured for wireless communications. The computer program product includes a non-transitory computer-readable medium having non-transitory program code recorded thereon. The program code includes program code to schedule user equipments (UEs) served by a first set of base stations in accordance with a first time division duplex (TDD) configuration. The first set of base stations is located between a second set of base stations in a first region that operates in a second TDD configuration and a third set of base stations in a second region that operate in a third TDD configuration. The first TDD configuration has no downlink subframe colliding with an uplink subframe of the second TDD configuration. The program code also includes program code to restrict UEs served by the first set of base stations to avoid user equipment to user equipment interference with UEs and base stations operating with the third TDD configuration.

Offered is an apparatus configured for wireless communication. The apparatus includes a memory and a processor(s) coupled to the memory. The processor is configured to schedule user equipments (UEs) served by a first set of base stations in accordance with a first time division duplex (TDD) configuration. The first set of base stations is located between a second set of base stations in a first region that operates in a second TDD configuration and a third set of base stations in a second region that operate in a third TDD configuration. The first TDD configuration has no downlink subframe colliding with an uplink subframe of the second TDD configuration. The processor is also configured to restrict UEs served by the first set of base stations to avoid user equipment to user equipment interference with UEs and base stations operating with the third TDD configuration.

Offered is a method of wireless communication. The method includes determining when downlink time division duplex (TDD) communications of a first user equipment (UE) experience interference from uplink TDD communications of a second UE when communication frames of the first UE and second UE are aligned. The method also includes scheduling communications to reduce the interference.

Offered is an apparatus for wireless communication. The apparatus includes means for determining when downlink time division duplex (TDD) communications of a first user equipment (UE) experience interference from uplink TDD communications of a second UE when communication frames of the first UE and second UE are aligned. The apparatus also includes means for scheduling communications to reduce the interference.

Offered is a computer program product configured for wireless communications. The computer program product includes a non-transitory computer-readable medium having non-transitory program code recorded thereon. The program code includes program code to determine when downlink time division duplex (TDD) communications of a first user equipment (UE) experience interference from uplink TDD communications of a second UE when communication frames of the first UE and second UE are aligned. The program code also includes program code to schedule communications to reduce the interference.

Offered is an apparatus configured for wireless communication. The apparatus includes a memory and a processor(s) coupled to the memory. The processor(s) is configured to determine when downlink time division duplex (TDD) communications of a first user equipment (UE) experience interference from uplink TDD communications of a second UE when communication frames of the first UE and second UE are aligned. The processor(s) is also configured to schedule communications to reduce the interference.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
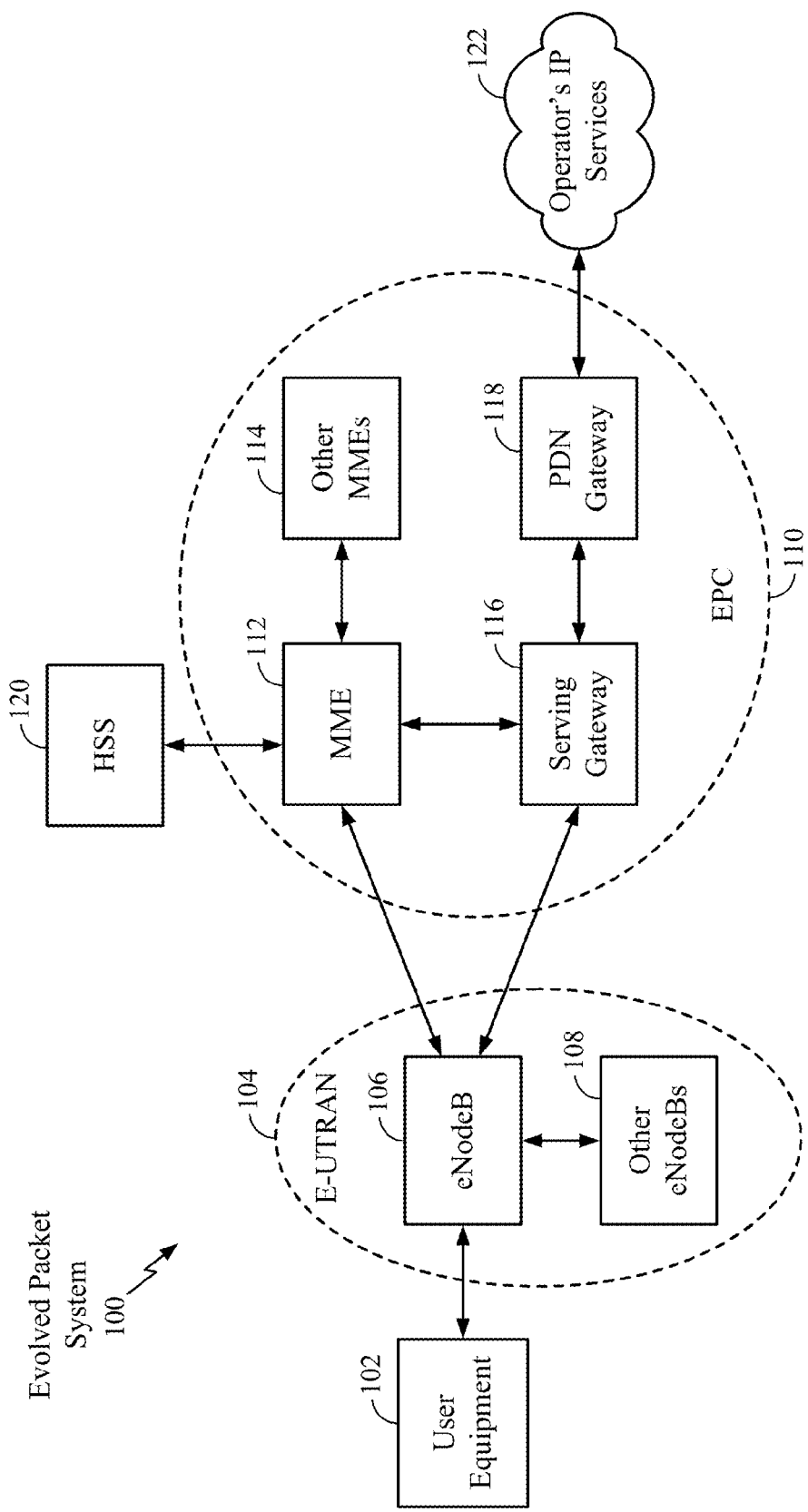
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity, those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
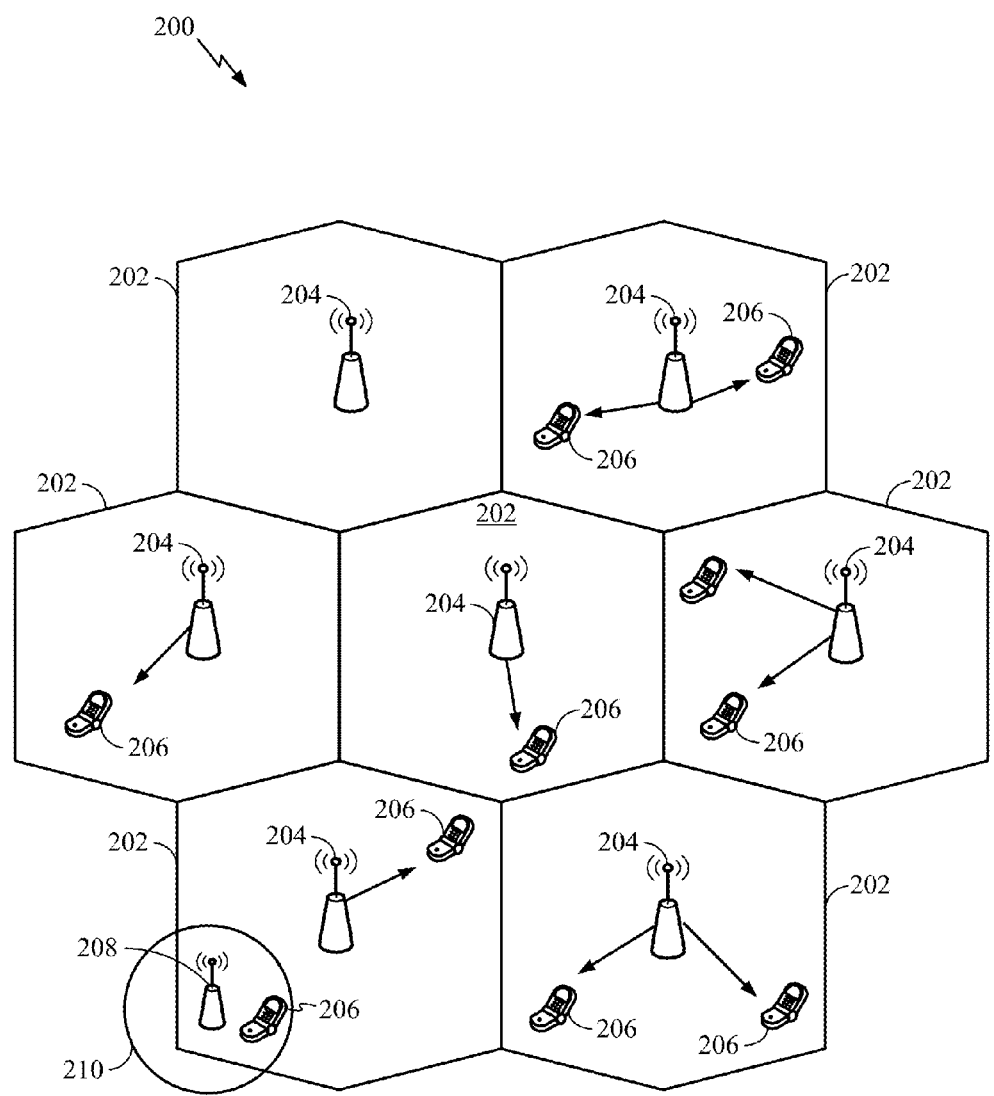
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity.

Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
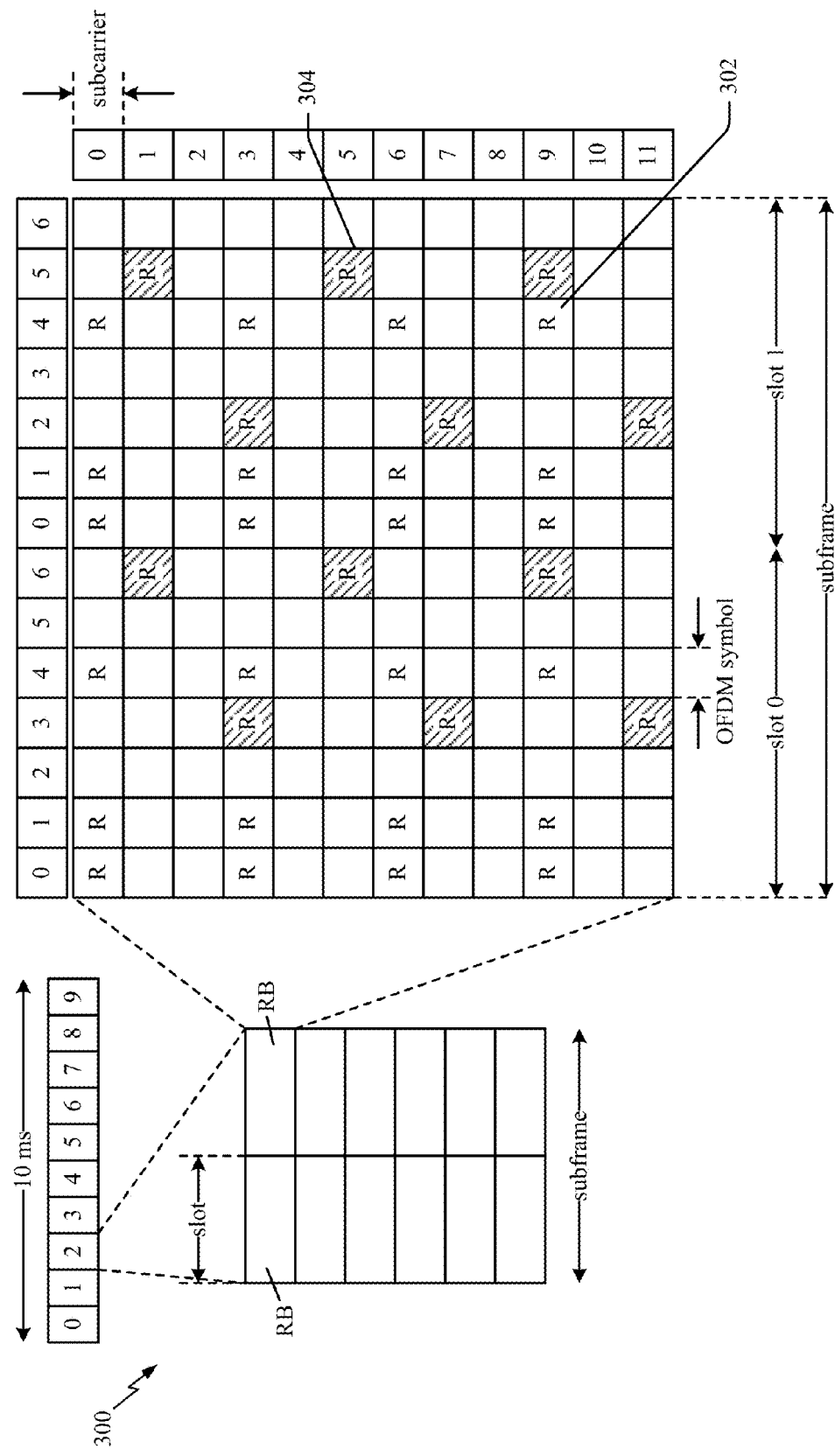
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
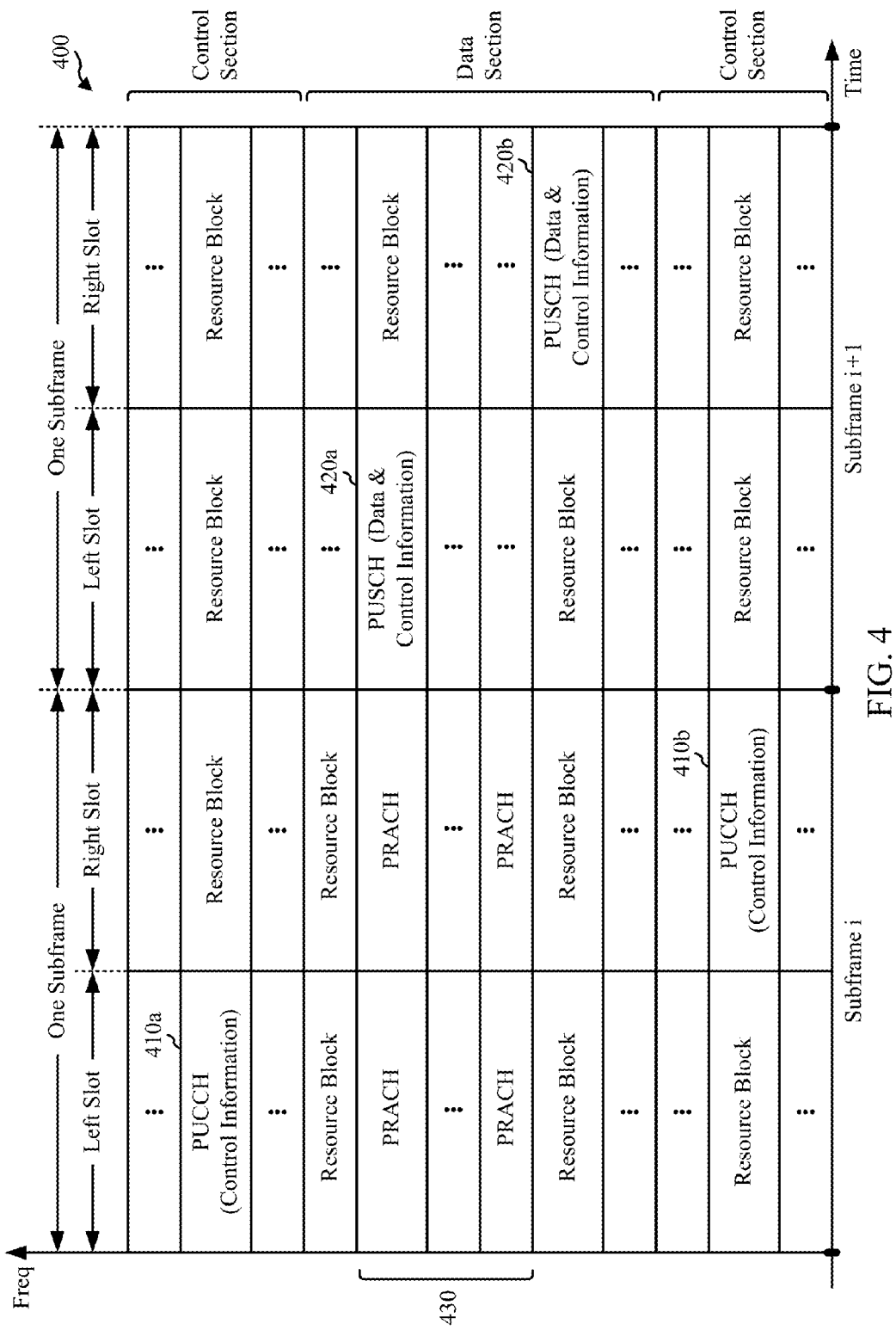
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410*a*, 410*b* in the control section to transmit control information to an eNodeB. The UE may also be assigned resource blocks 420*a*, 420*b* in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
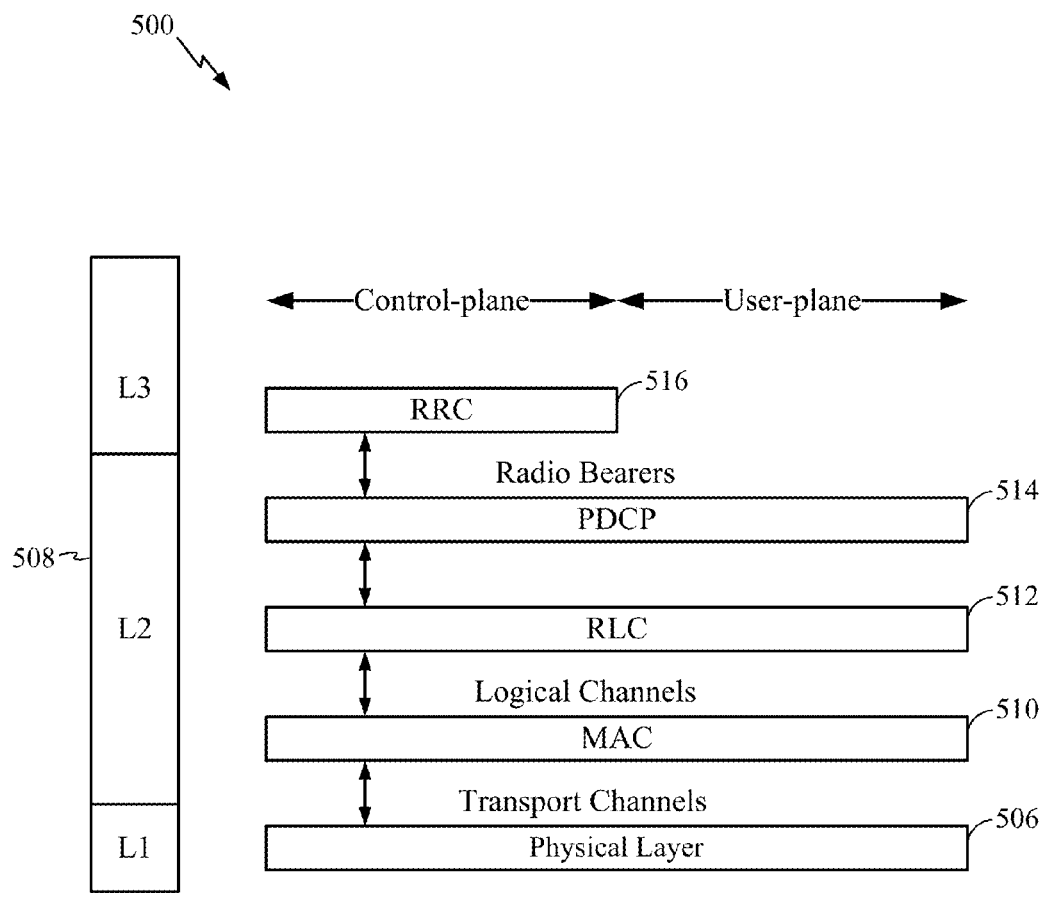
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
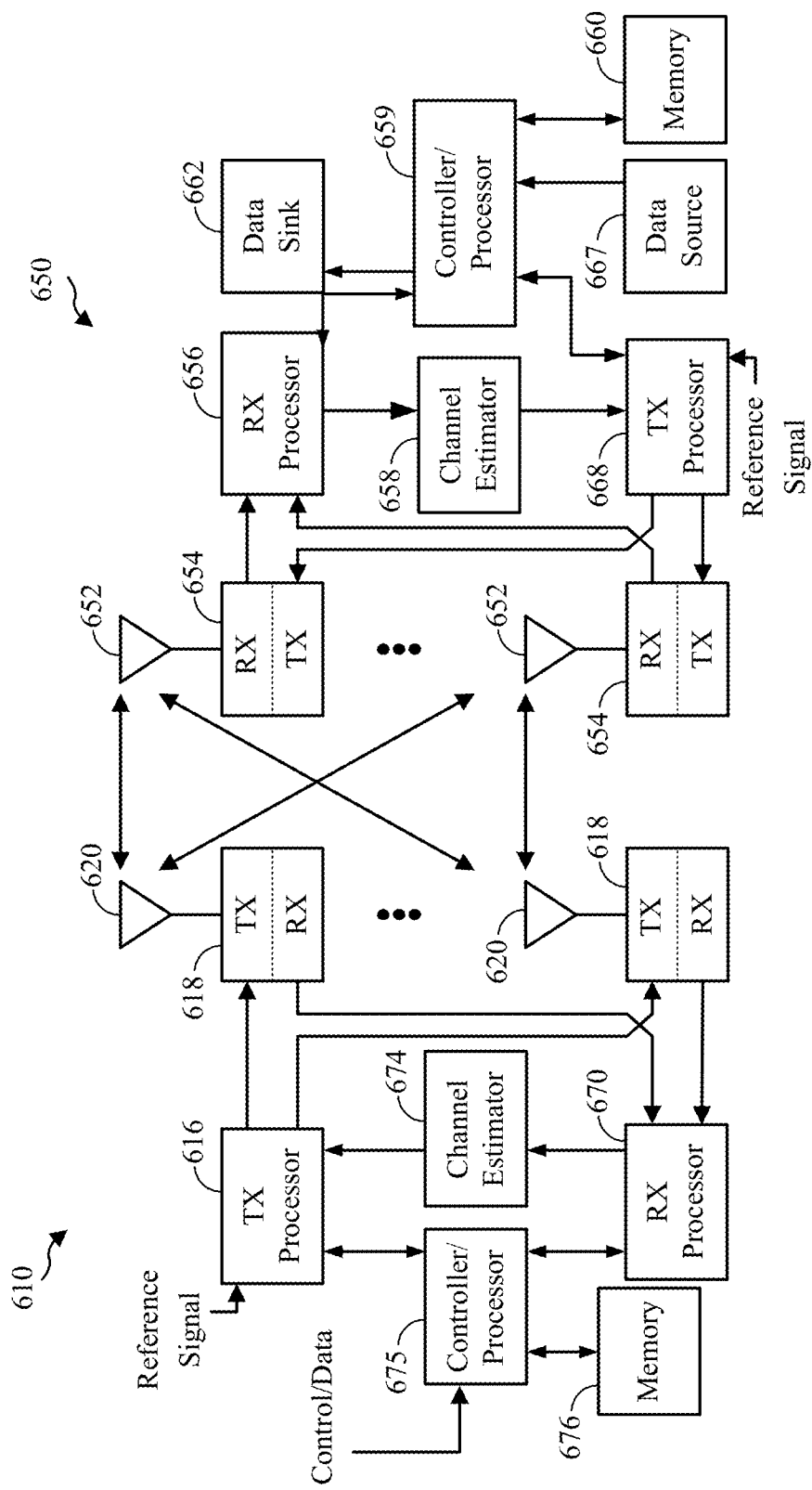
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Supporting Different LTE-TDD Configurations in Neighboring Regions and/or Adjacent Carriers When communications of a single radio access technology, or different radio access technologies in neighboring communication spectrums are operating at the same time, potential interference between devices may occur. For example, if one communication device is attempting to receive communications at the same time when another device is transmitting, and both devices are using the same or proximate portions of a communication spectrum, the receiving device may experience interference.

In long term evolution,-time division duplexed (LTE-TDD, the same communication spectrum is used for both uplink transmission from the UEs to the eNodeB and for downlink transmission from an eNodeB to the UEs. The uplink and downlink transmissions are orthogonalized in time, however, to coordinate when UEs receive and when they transmit. The different TDD configurations supported in LTE are shown in Table 1 below.

TABLE 1

| UL-DL Config | DL-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In table 1, D indicates a subframe for downlink (DL) (i.e., eNodeB to UE communications), U indicates a subframe for uplink (UL) (i.e., UE to eNodeB communications), and S indicates a special subframe. A special subframe may include downlink Orthogonal Frequency Division Multiplexed (OFDM) symbols, a guard period, and uplink OFDM symbols.

In LTE-TDD implementations, neighboring eNodeB base stations are typically synchronized with the same subframe boundaries. Further, a neighboring base station may operate in the same TDD configuration as its neighbors. For example, two neighboring base stations may both operate using TDD configuration 0 with a downlink subframe, a special subframe, and three uplink subframe, repeating every 5 ms. So when one base station is in downlink, its neighbor may be in downlink as well. In this scenario, a UE being served by one base station may experience interference in a downlink subframe from a neighboring base station, particularly if the UE is located near the service boundaries between the two base stations. An example is shown in FIG. 7.

Figure 7:
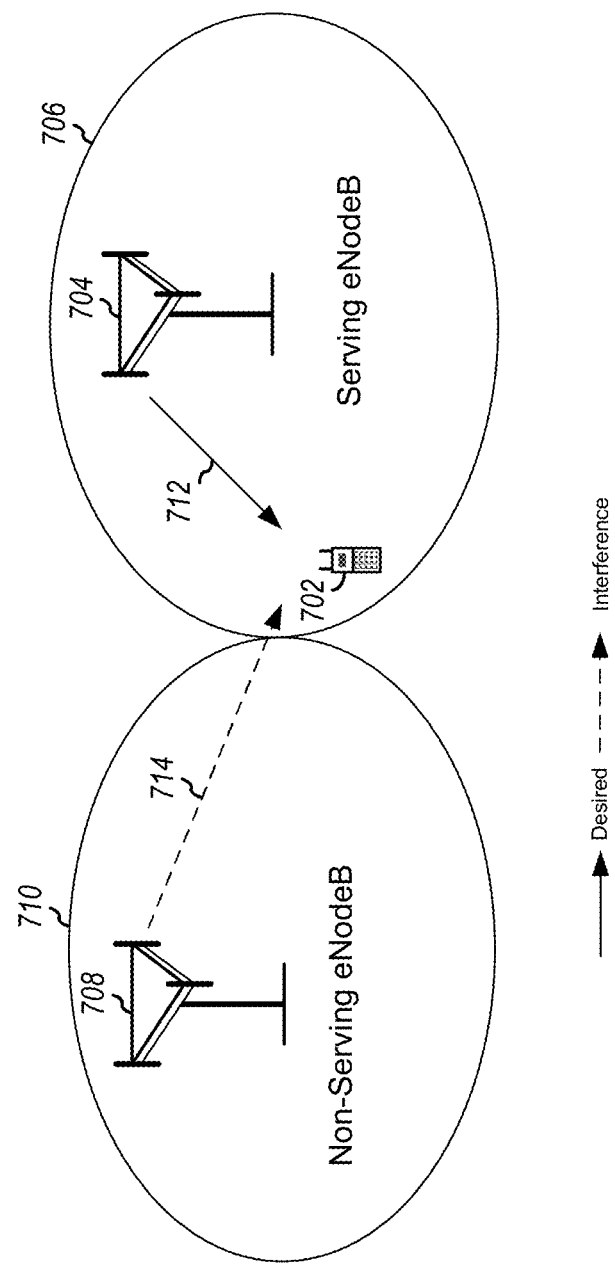
FIG. 7 is a block diagram conceptually illustrating an example of a telecommunications system.

As shown in FIG. 7, the UE 702 is served by the eNodeB 704 at the edge of the service area 707. Downlink transmission 712 is the desired signal to be received by the UE 702. But the UE 702 also receives downlink (DL) transmission 714 from the non-serving eNodeB 708, as the UE 702 is close to the edge of the service area 710 of the non-serving eNodeB 708. The downlink transmissions 714 from the eNodeB 708 may interfere with the UE receiving the desired downlink transmission 712. Because a UE is typically connected to the strongest available cell, interfering downlink transmission 714 is likely to be weaker, or in the same range of strength, than the desired downlink transmission 712.

While LTE-TDD is primarily designed for the case when neighboring cells use the same configuration, it may be desirable to allow the eNodeB to choose the TDD configuration depending on its traffic needs. Thus, at certain times neighboring base stations may operate using different TDD configurations. This may lead to uplink communications for one base station occurring at the same time as downlink communications for another base station. Because the same spectrum is used for downlink and uplink, if neighboring cells are using different TDD configurations, a UE may experience downlink interference from a UE engaging in uplink communications with a neighboring eNodeB operating in a different TDD configuration. An example of this scenario is shown in FIG. 8.

Figure 8:
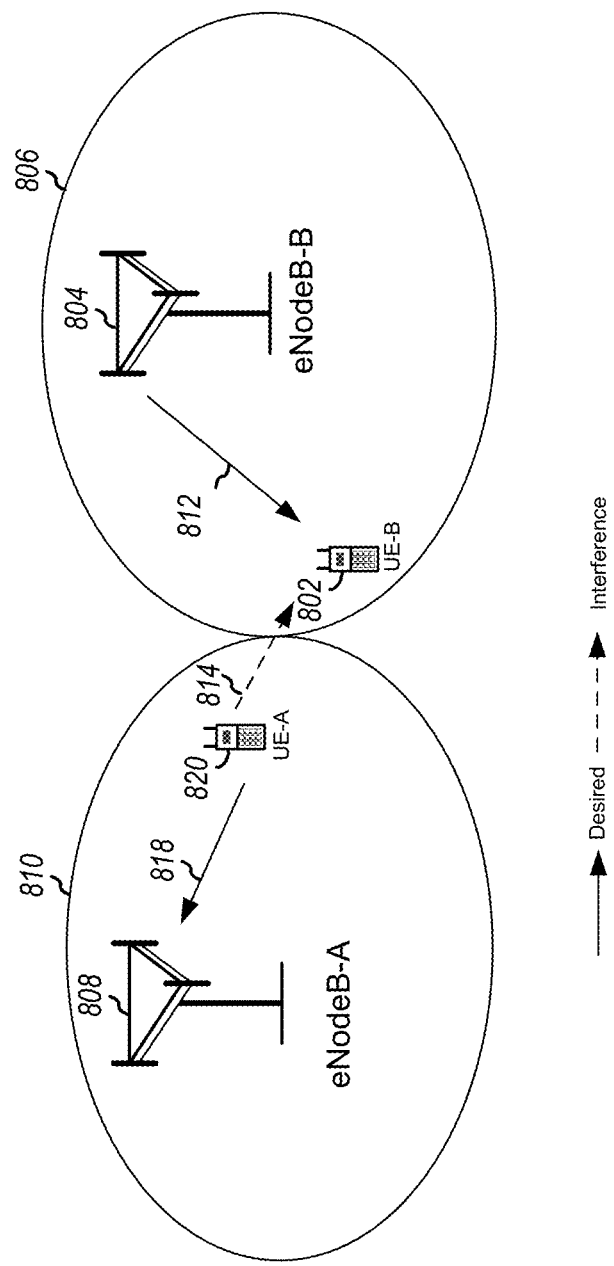
FIG. 8 is a block diagram conceptually illustrating an example of a telecommunications system.

In FIG. 8, the eNode B-A 808 is engaged in uplink communications 818 during its uplink subframe with the UE-A 820 at the same time the eNodeB-B 804 is engaged in downlink communications 812 during its downlink subframe with the UE-B 802. That is, the UE-A 820 is in an uplink subframe at the same time as the UE-B 802 is in a downlink subframe. Because the UEs are located near each other (and near the edge of the respective eNodeB coverage areas 806 and 810), and because the same communication bandwidth is used by each UE for both uplink and downlink, the uplink transmissions 814 of the UE-A 820 may interfere with the downlink reception of the UE-B 802. Even though the UE-A 820 may be transmitting at a much lower power than the eNodeB 804, if the UE-A 820 is close enough to the UE-B 802, the uplink interference 814 from the UE-A 820 may be a stronger received signal from the perspective of the UE-B 802 than the intended downlink communication 812 from the eNodeB 804. This situation may lead to pronounced interference to the UE-B 802.

UEs may not be designed to handle such interference. For example, UEs may be designed assuming similar interference levels on all downlink subframes. Even one subframe seeing such interference may lead to poor performance on several subframes and possibly result in link failure and a dropped call. Two examples of situations that may lead to radio link failure are illustrated. In the first example, a UE may be filtering its channel estimates obtained from a common reference signal (CRS) over multiple subframes without weighing according to the interference level. The channel estimation may be corrupted by the UE to UE interference (such as that illustrated in FIG. 8) on one subframe leading to poor performance on one or more following subframes. In the second example, automatic gain control (AGC) may be controlled based on received signal power. Having one subframe with a large received power may cause the AGC to assume a large average received power resulting in poor quantization on downlink subframes not observing UE to UE interference and possible radio link failure.

Similar interference issues may also occur if two adjacent carriers use different TDD configurations, resulting in subframes that are downlink for one carrier and uplink for another. For example, if one carrier communicates in bandwidth spectrum 2305 to 2325 MHz while another carrier communicates in bandwidth spectrum 2327.5 to 2357.5 MHz, the guard band between them is only 2.5 MHz. The interference issues in this case may cause two problems. First, UE transmission leakage from its own carrier spectrum to a neighboring carrier's spectrum may cause higher interference in the neighboring UEs bandwidth. The interference caused would decrease as frequency spacing increases. Data allocated on the edge closer to the interfering carrier would see more of this interference than data allocated on the center resource blocks. Second, for a UE of the first carrier, the transmit power in its bandwidth may cause AGC saturation at a neighboring UE operating on the second carrier (similar to the AGC issues described above with regard to the example of FIG. 8).

Proposed are solutions to the potential interference scenarios discussed above. An aggressor UE (the UE causing the UE to UE interference) is said to be connected to an aggressor eNodeB. A victim UE (the UE experiencing the UE to UE interference) is said to be connected to a victim eNodeB. The victim eNodeB and aggressor eNodeB may communicate over a backhaul or similar communication channel to share TDD configurations as well as information regarding potential UE to UE interference experienced by each of the eNodeBs' UEs. One potential solution to the interference scenarios described above is to schedule the aggressor UE (by the aggressor eNodeB) for uplink communications (i.e., transmissions) only during uplink subframes of the victim eNodeB. Another potential solution (for the adjacent carrier case) may be to avoid edge resource blocks (i.e., communication resources on the border of the communication spectrum that may lead to interference) for downlink subframes of the victim eNodeB used by aggressor UEs for uplink communications.

In certain scenarios, however, it may be difficult to identify which specific UE is the aggressor UE. In that case, scheduling restrictions may be applied to all UEs served by the aggressor eNodeB. For example, all UEs served by the aggressor eNodeB may be scheduled so that they only engage in uplink communications during uplink subframes of the victim eNodeB. This may be easier to implement in the case of UE to UE interference when the neighboring eNodeBs operate with different TDD configurations because only the edge eNodeBs are impacted. Otherwise, large numbers of UEs may be denied uplink communication opportunities, which may lead to undesired communication performance for those UEs. Similarly, the above solution may be easier to implement in the case where the victim and aggressor eNodeB are operated by the same operator. If the victim and aggressor eNodeBs are operated by different commercial operators, it may be difficult to place restrictions on an eNodeB of one commercial operator to improve communication performance of a competing commercial operator.

Figure 9:
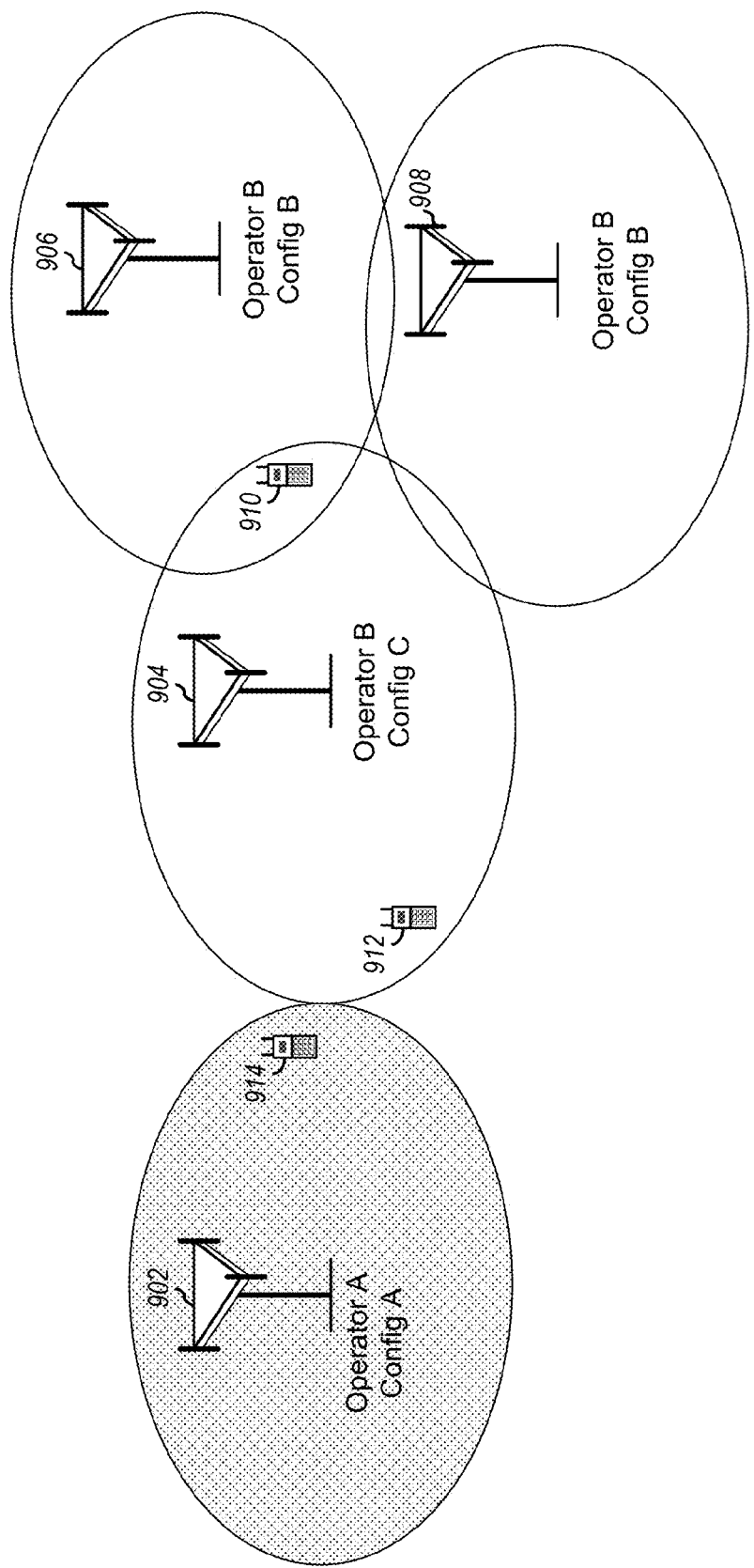
FIG. 9 is a block diagram conceptually illustrating an example of a telecommunications system.

In such a case, eNodeBs at the edge of a commercial operator's geographic region (such as the border between one state and another), may be configured so that the victim operator's eNodeBs use a configuration that has no downlink subframes overlapping with uplink subframes of the other operator. This configuration will avoid any UE to UE interference issues for the victim eNodeB UEs. Victim operator's eNodeBs that are farther away from the region edge may use any desired TDD configuration. For example, FIG. 9 shows eNodeBs of neighboring commercial operators (operator A and operator B). The eNodeB 902 is with operator A while eNodeBs 904, 906, and 908 are with operator B. To avoid interference between UEs of eNodeBs 902 and 904 (such as UE 914 and UE 912), the eNodeB 904 may operate using configuration C, which avoids UE to UE interference with configuration A used by the eNodeB 902. In this manner, operator B may avoid interference issues with operator A along the edge between the operator regions. Now any interference issues between potential victim or aggressor UEs may be contained entirely within the network of operator B, allowing for implementation of other solutions. For example, operator B may choose to configure eNodeBs 906 and 908 to operate using configuration B to avoid UE to UE interference between the eNodeB 904 and eNodeBs 906 and 908, all within operator B's control. And even if potential issues arise between configuration B and configuration C, they may be resolved within the same operator (for example, by rescheduling an interfering UE as described above).

An approach to avoiding edge interference between operator regions is for one operator (such as the victim operator) to configure its eNodeBs along the operator edge to operate in the same configuration as the eNodeB of the aggressor operator. For example, in reference to FIG. 9, operator B could switch the eNodeB 904 to configuration A, the same configuration used by the eNodeB 902 controlled by operator A. This will ensure that the eNodeB 902 and the eNodeB 904 will avoid any uplink/downlink collisions within subframes. Another approach is to use TDD configuration 0, as illustrated in Table 1 above. Downlink subframes of TDD configuration 0 do not collide with uplink subframes of any other TDD configurations, as subframe 0 and subframe 5 (the only downlink subframes of TDD configuration 0) are downlink subframes for all TDD configurations. Thus, if edge eNodeBs of one operator are radio frame aligned with edge eNodeBs of another operator, an operator may choose to operate its edge eNodeBs in TDD configuration 0. Thus, potential UE to UE interference is avoided on downlink subframes for UEs being served by those edge eNodeBs, regardless of the TDD configuration used by the other operator. Operating in TDD configuration 0 in this manner may avoid a victim operator having to change its TDD configuration if the aggressor operator changes its TDD configuration. Other approaches/TDD configurations may also be used.

Another approach to avoiding UE interference is for an eNodeB to advertise different TDD configurations to different UEs. Put another way, the eNodeB may operate using one TDD configuration, but instruct certain of its served UEs to use a different TDD configuration. In this manner, victim UEs that are experiencing interference may be scheduled to avoid communications on downlink subframes that overlap with uplink subframes of a neighboring aggressor eNodeB, while UEs served by the victim eNodeB not experiencing interference may operate in a TDD configuration with additional downlink subframes.

For example, referring to FIG. 9, if the eNodeB 904 (serving UEs 910 and 912) is operating in TDD configuration 2 and the eNodeB 902 (serving UE 914) is operating in TDD configuration 3, the UE 912, which is close to the UE 914, may experience interference from the UE 914 during subframes 3 and 4 when the UE 914 is engaged in uplink communications and the UE 912 is attempting to engage in downlink communications. To avoid this interference, the eNodeB 904 may instruct the UE 912 to switch to TDD configuration 0, thereby avoiding interference to the UE 912 from the UE 914 in subframes 3 and 4. Because the eNodeB 904 may continue operating in TDD configuration 2, the eNodeB 904 may not schedule communications with the UE 912 during subframes 3, 4, 8, and 9 (due to differences between TDD configuration 0 and TDD configuration 2), but communications between the eNodeB 904 and other UEs, such as the UE 910, may continue as normal using all subframes of TDD configuration 2.

TDD configurations are typically communicated to a UE within system information block (SIB) 1, which is common to all UEs. To perform the above TDD configuration switch for a specific UE, additional signaling of the TDD configuration may be introduced. Further, the eNodeB may employ mechanisms to identify which UEs are observing the illustrated UE to UE interference.

Multiplexing UEs with different TDD configurations, as described above, may present other challenges for an eNodeB such as coordinating HARQ timelines, acknowledgement/negative acknowledgment (ACK/NACK) or channel quality index (CQI) transmissions. Such signals may be transmitted on orthogonal pilot sequences by different UEs, but rearranging these signals may be performed when serving UEs operating in different TDD configurations. Sample techniques for controlling adjusted communications for the above solutions are discussed below.

The physical uplink control channel (PUCCH) contains CQI and ACK signals. UEs operating in different TDD configurations may attempt to use the same PUCCH resource. To avoid these collisions, CQI periodicity may be configured by an eNodeB so that UEs do not try to communicate CQI using the same resources. A PUCCH resource used by a UE to send ACK signals depends on when the UE received the downlink information (e.g., PDCCH/PDSCH) and on the UE TDD configuration. PDCCH locations and PDSCH assignments for different UEs may be planned to avoid PUCCH collisions during uplink communications. Uplink control resources may also be increased so that different resources are allocated for UEs using different TDD configurations. PUCCH offsets (which are UE specific parameters) may be used to assign the resources to UEs to avoid collision.

Sounding reference signals (SRS) are transmitted on the uplink for uplink channel measurement. An eNodeB can configure SRS periodicity and subframe offset to avoid collisions between UEs. Physical HARQ Indicator Channel (PHICH) is a downlink channel where UEs receive acknowledgments for transmitted uplink data. PHICH collisions (where different UEs are looking for acknowledgments in the same location/resource) may be avoided by using a larger number of PHICH groups. Also, UE specific parameters may orthogonalize the PHICH so that UEs are not looking for acknowledgements in similar resources.

Detecting victim UEs, namely UEs experiencing or likely to experience UE to UE interference, also presents challenges. One solution identifies when a UE is repeatedly having difficulty communicating on the same subframes. This may be information about which downlink subframes of a victim eNodeB correspond to uplink subframes of a neighboring eNodeB. The eNodeB may focus on such conflicting subframes or the eNodeB may compare those conflicting subframes with other non-conflicting subframes proving difficult for a victim UE to decode. Based on the results of the eNodeB inquiry, the eNodeB may determine whether to implement one of the solutions discussed above. Another technique identifies when the UE reports very different CQI reports corresponding to different subframes. Such behavior may indicate UE to UE interference. A further technique identifies when a UE is indicating a good channel quality (as indicated by a good reported reference signal receive power (RSRP) or CQI) but has difficulty decoding received data. Also, if a UE hands off to a different network (such as 2G/3G) despite having a good RSRP for LTE communications, that may also indicate UE to UE interference.

A further technique may be applied when a UE is experiencing interference from a neighboring bandwidth. Based on sub-band CQI reports (i.e., CQI reports corresponding to different regions in the communication frequency), the victim UE may indicate a decreasing interference as the UE moves away from the bandwidth of the interfering UE. If this behavior is identified, then the victim UE may be identified as experiencing UE to UE interference.

A UE may also monitor the interference it is experiencing and report the interference level to a base station. If the UE reports interference with significant variation between subframes, the variation may indicate UE to UE interference. Also, if a UE reports to a base station that the UE is near an edge of a cell of a base station using the same bandwidth but a different TDD configuration, then that UE may be identified as a possible victim UE experiencing UE to UE interference.

Detecting an aggressor UEs, namely UEs causing or likely to cause UE to UE interference also presents challenges. In one technique, if a UE is on the edge of a cell and can detect a strong signal from a non-serving base station (for example with a high RSRP) that is using a different TDD configuration than the serving base station, the UE may be an aggressor UE. For certain combinations of TDD configurations, a UE that is an aggressor for certain subframes may also be a victim UE for different subframes. Thus, techniques to identify victim UEs may also be applied to identify potential aggressor UEs.

To avoid certain effects of UE to UE interference, techniques may be employed to prevent a UE from transmitting in certain uplink subframes. Uplink subframes transmit uplink data, ACK/NACK messages (acknowledging receipt of downlink data), channel quality index (CQI) reports, and sounding reference signals (SRSs). A base station may limit UE uplink activity by only sending a UE uplink grants for desired subframes. If a UE uplink transmission attempt fails (as indicated by an ACK/NACK message from a base station to a UE), a UE may attempt uplink retransmission at an uplink subframe not scheduled by the base station. To avoid uplink retransmissions on undesired subframes, a base station may send an acknowledgment message to the UE, even if the original transmission of a data packet was not decoded successfully. The base station may then schedule a new grant to the UE requesting the unsuccessfully decoded data packet be retransmitted.

CQI and SRS periodicity and subframe offsets may be configured by a base station such that those messages are only sent on desired uplink subframes. Uplink ACK/NACK messages are sent on specific uplink subframes corresponding to specific downlink subframes. To avoid uplink ACK/NACK messages being sent on undesired uplink subframes, a base station may schedule downlink messages to the UE on downlink subframes with an ACK/NACK configuration matching desired uplink subframes.

To avoid UE to UE interference, scheduling of uplink resources of potential aggressor UEs may be prioritized to avoid edge resource blocks of subframes that would cause the interference. UEs can be identified as potential aggressors based on resource allocations and transmission power. For example, UEs transmitting at a high power and/or UEs allocated a large number of resource blocks could be identified as potential aggressors. In another aspect, uplink communications of an identified interfering UE are scheduled to avoid edge resource blocks of subframes that would cause the interference. In yet another aspect, the aggressor UEs are allocated fewer resources. In still another aspect, aggressor UEs control the interference on their own, or report to a base station that they are aggressors.

Figure 10:
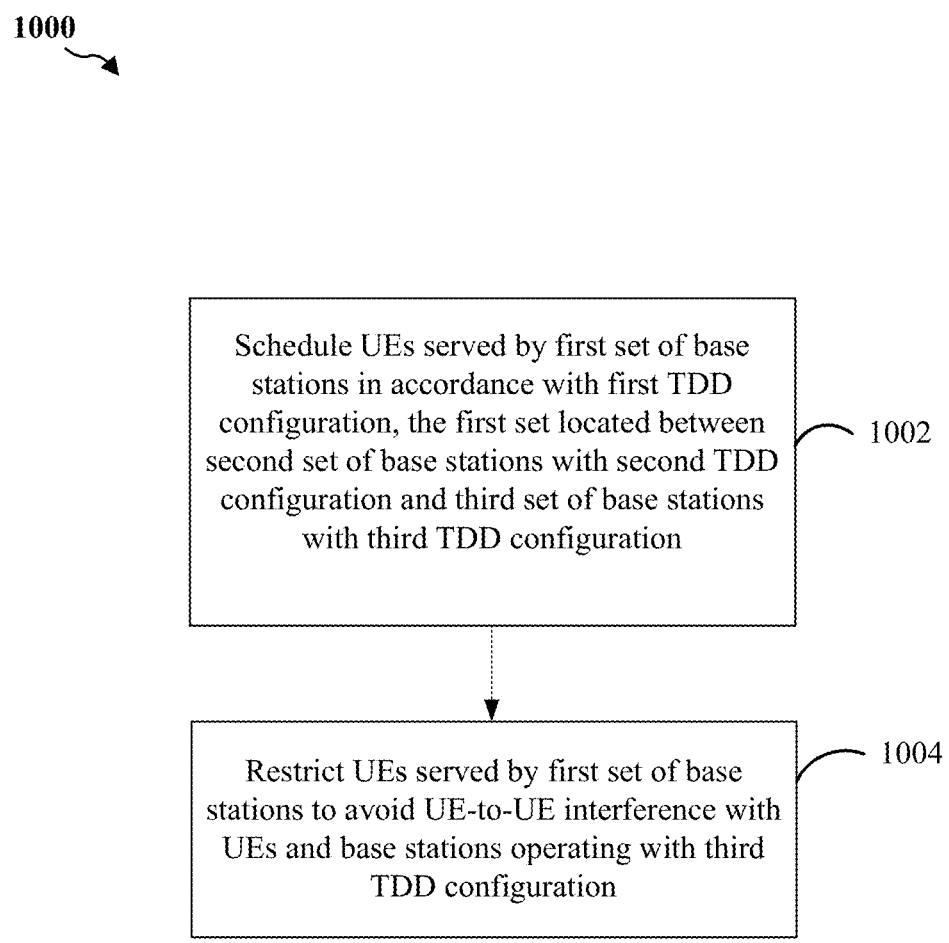
FIG. 10 is a block diagram illustrating a method for supporting different LTE-TDD configurations in neighboring regions or adjacent carriers according to one aspect of the present disclosure.

FIG. 10 illustrates a method 1000. In block 1002, a device schedules user equipments (UEs) served by a first set of base stations in accordance with a first time division duplex (TDD) configuration. The first set of base stations is located between a second set of base stations in a first region that operates in a second TDD configuration and a third set of base stations in a second region that operate in a third TDD configuration. The first set of base stations being between the second set and third set does not necessarily mean the base stations are collinear. Further, each set may include one or more base stations. For example, the first set of base stations between the third and second set may include a situation where the first set of base stations is near or overlaps with coverage areas of other base stations that have little to no overlap between each other. As an illustration, the base station 904 in FIG. 9 may be between the base stations 902 and 908, even if base station 908 had no overlap with base station 906. The first TDD configuration has no downlink subframe colliding with an uplink subframe of the second TDD configuration. In block, 1004 a device restricts UEs served by the first set of base stations to avoid user equipment to user equipment interference with UEs and base stations operating with the third TDD configuration.

Figure 11:
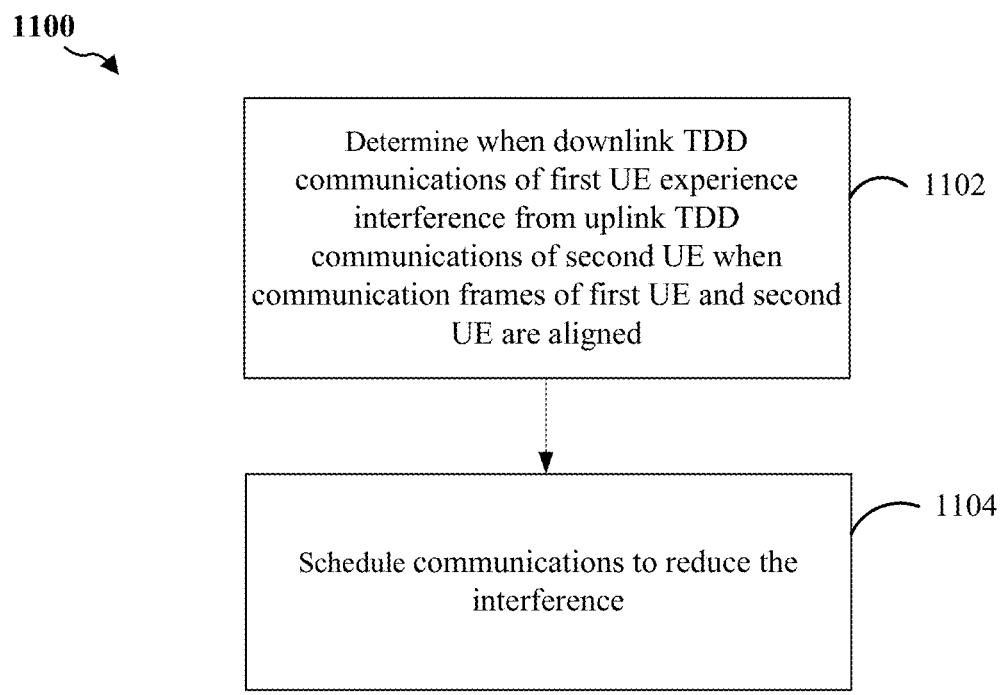
FIG. 11 is a block diagram illustrating a method for supporting different LTE-TDD configurations in neighboring regions or adjacent carriers according to one aspect of the present disclosure.

FIG. 11 illustrates a method 1100. In block 1102, a device determines when downlink time division duplex (TDD) communications of a first user equipment (UE) experience interference from uplink TDD communications of a second UE when communication frames of the first UE and second UE are aligned. In block 1104, a device schedules communications to reduce the interference.

In one configuration, the eNodeB 610 is configured for wireless communication including means for determining, means for restricting, and means for scheduling. In one aspect, the means may be the transmit processor 616, receive processor 670, antenna 620, controller processor 675 and/or memory 646 configured to perform the functions recited by the means. In another aspect, the aforementioned means may be any module or any apparatus configured to perform the functions recited by the aforementioned means.

Figure 12:
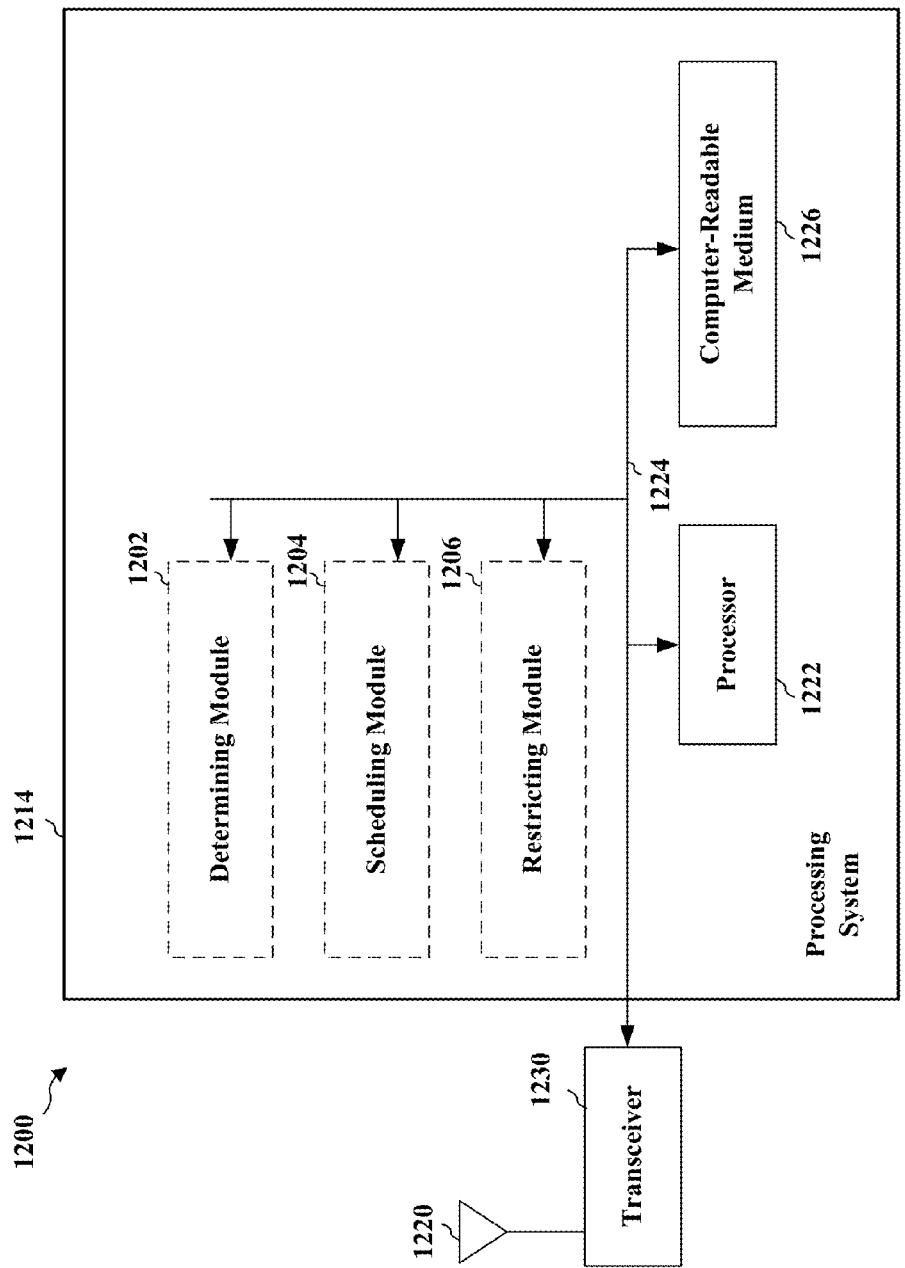
FIG. 12 is a block diagram illustrating the data flow between different modules/means/components in an exemplary apparatus.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system includes a determining module 1202, a scheduling module 1204, and a restricting module 1206. The determining module 1202 can determine when downlink TDD communications of a first UE experience interference from uplink TDD communications of a second UE when communication frames of the first UE and second UE are aligned. The scheduling module 1204 can schedule communications to reduce interference. The scheduling module 1204 can also schedule UEs served by a first set of base stations in accordance with a first TDD configuration. The first set of base stations is located between a second set of base stations in a first region that operates in a second TDD configuration and a third set of base stations in a second region that operate in a third TDD configuration. The first TDD configuration has no downlink subframe colliding with an uplink subframe of the second TDD configuration. The restricting module 1206 can restrict UEs served by a first set of base stations to avoid user equipment to user equipment interference with UEs and base stations operating with a third TDD configuration.

The modules may be software modules running in the processor 1222, resident/stored in the computer readable medium 1226, one or more hardware modules coupled to the processor 1222, or some combination thereof. The processing system 1214 may be a component of the UE 650 or eNodeB 610 and may include the memory 660, the transmit processor 668, the receive processor 656, the modulators/demodulators 654*a-r*, the antenna 652*a-r*, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a base station, comprising:
    determining, at the base station, when downlink time division duplex (TDD) communications of a first user equipment (UE) experience interference from uplink TDD communications of a second UE when communication frames of the first UE and second UE are aligned, the first UE being assigned a first TDD configuration and the second UE being assigned a second TDD configuration;
    scheduling, at the base station, communications by at least scheduling the first UE with a new TDD configuration that is different from the first TDD configuration and the second TDD configuration to reduce the interference; and
    instructing, at the base station, the first UE to use the new TDD configuration while the base station operates with the first TDD configuration.

2. The method of claim 1, in which the scheduling comprises scheduling uplink communications of the second UE only on subframes when the first UE is engaged in uplink communications.

3. The method of claim 1 in which the new TDD configuration is different from a TDD configuration for other UEs served by the base station serving the first UE.

4. The method of claim 1, in which the scheduling comprises scheduling the first UE with TDD configuration 0.

5. The method of claim 1, further comprising detecting the second UE causing the interference.

6. The method of claim 1, further comprising detecting the first UE experiencing the interference.

7. The method of claim 1, in which the scheduling comprises scheduling uplink communications of the second UE to avoid at least one edge resource block on a frequency closest to a frequency used by the first UE.

8. The method of claim 1, in which the scheduling comprises prioritizing scheduling uplink resources of potential aggressor UEs to avoid at least one edge resource block of a subframe that would cause the interference.

9. The method of claim 8, in which the potential aggressor UEs comprises UEs transmitting at a high power and/or UEs allocated a large number of resource blocks.

10. The method of claim 1, in which the scheduling comprises scheduling uplink communications of the second UE to avoid at least one edge resource block of a subframe that would cause the interference.

11. The method of claim 1, in which the scheduling comprises the second UE scheduling its communications to avoid the interference to the first UE.

12. The method of claim 1, in which the second UE performs the determining and the method further comprises sending a report of interference to the base station.

13. The method of claim 1, in which the scheduling comprises reducing a resource allocation to the second UE.

14. The method of claim 1, further comprising advertising different TDD configurations to different UEs.

15. An apparatus for wireless communication at a base station, comprising:
    means for determining when downlink time division duplex (TDD) communications of a first user equipment (UE) experience interference from uplink TDD communications of a second UE when communication frames of the first UE and second UE are aligned, the first UE being assigned a first TDD configuration and the second UE being assigned a second TDD configuration;
    means for scheduling communications by at least scheduling the first UE with a new TDD configuration that is different from the first TDD configuration and the second TDD configuration to reduce the interference; and
    means for instructing the first UE to use the new TDD configuration while the base station operates with the first TDD configuration.

16. A non-transitory computer-readable medium having non-transitory program code recorded thereon at a base station, the non-transitory program code comprising:
    program code, at the base station, to determine when downlink time division duplex (TDD) communications of a first user equipment (UE) experience interference from uplink TDD communications of a second UE when communication frames of the first UE and second UE are aligned, the first UE being assigned a first TDD configuration and the second UE being assigned a second TDD configuration;
    program code, at the base station, to schedule communications by at least scheduling the first UE with a new TDD configuration that is different from the first TDD configuration and the second TDD configuration to reduce the interference; and
    program code, at the base station, to instruct the first UE to use the new TDD configuration while the base station operates with the first TDD configuration.

17. A base station configured for wireless communications, comprising:
a memory; and
at least one processor coupled to the memory, the at least one processor being configured:
to determine when downlink time division duplex (TDD) communications of a first user equipment (UE) experience interference from uplink TDD communications of a second UE when communication frames of the first UE and second UE are aligned, the first UE being assigned a first TDD configuration and the second UE being assigned a second TDD configuration;
to schedule communications by at least scheduling the first UE with a new TDD configuration that is different from the first TDD configuration and the second TDD configuration to reduce the interference; and
to instruct the first UE to use the new TDD configuration while the base station operates with the first TDD configuration.

18. The base station of claim 17, in which the at least one processor is further configured to schedule uplink communications of the second UE only on subframes when the first UE is engaged in uplink communications.

19. The base station of claim 17 in which the new TDD configuration is different from a TDD configuration for other UEs served by the base station serving the first UE.

20. The base station of claim 17 in which the at least one processor is further configured to schedule the first UE with TDD configuration 0.

21. The base station of claim 17, in which the at least one processor is further configured to detect an aggressor UE causing user equipment to user equipment interference.

22. The base station of claim 17, in which the at least one processor is further configured to detect a victim UE experiencing user equipment to user equipment interference.

23. The base station of claim 17, in which the at least one processor is further configured to schedule uplink communications of the second UE to avoid at least one edge resource block on a frequency closest to a frequency used by the first UE.

24. The base station of claim 17, in which the at least one processor is further configured to schedule by prioritizing scheduling of uplink resources of potential aggressor UEs to avoid at least one edge resource block of a subframe that would cause the interference.

25. The base station of claim 24, in which the potential aggressor UEs comprises UEs transmitting at a high power and/or UEs allocated a large number of resource blocks.

26. The base station of claim 17, in which the at least one processor is further configured to schedule by scheduling uplink communications of the second UE to avoid at least one edge resource block of a subframe that would cause the interference.

27. The base station of claim 17, in which the second UE comprises the at least one processor and the at least one processor is further configured to schedule communications of the second UE to avoid interference to the first UE.

28. The base station of claim 17, in which the second UE comprises the at least one processor and the at least one processor is further configured to report interference to the base station.

29. The base station of claim 17, in which the at least one processor is further configured to reduce a resource allocation to the second UE.

30. The base station of claim 17, in which the at least one processor is further configured to advertise different TDD configurations to different UEs.

* * * * *